May 26, 1925.
E. L. OVINGTON
HEATING SYSTEM AND MEANS
Filed Aug. 23, 1921
1,539,591
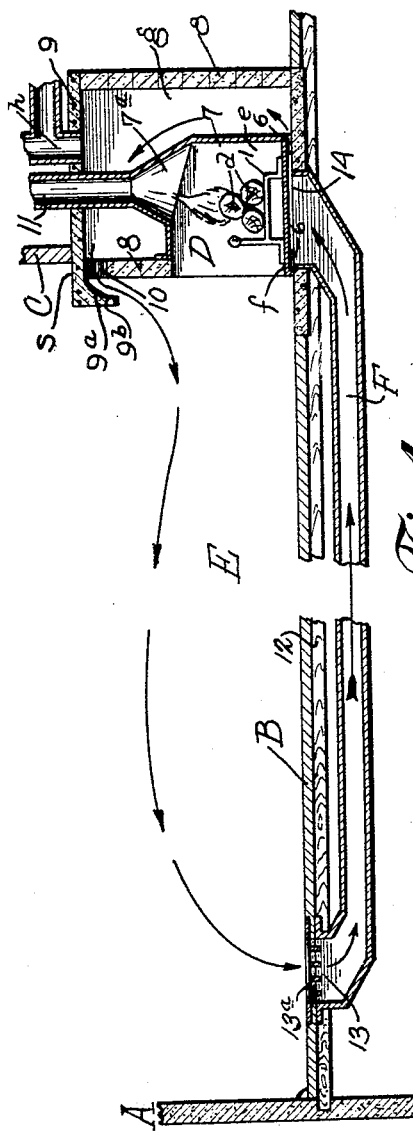
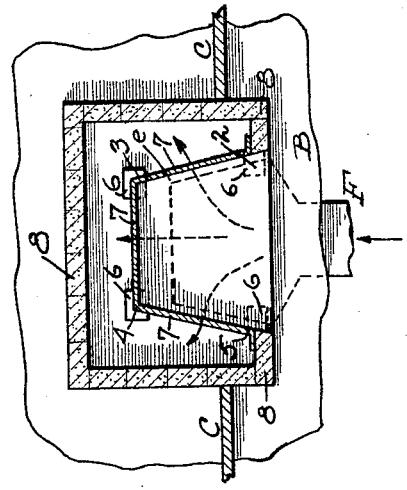
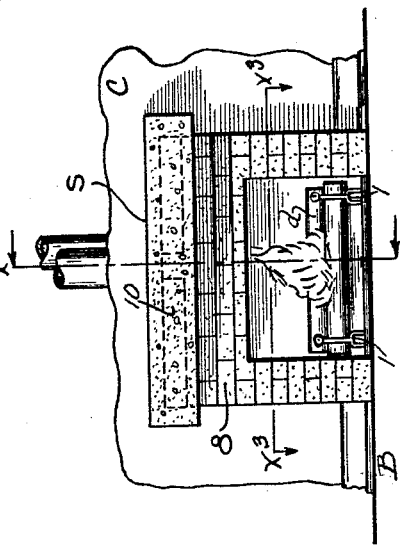
INVENTOR,
Earle L. Ovington;
BY
Raymond [illegible] Blakesley
ATTORNEY.

Patented May 26, 1925.

1,539,591

UNITED STATES PATENT OFFICE.

EARLE L. OVINGTON, OF SANTA BARBARA, CALIFORNIA.

HEATING SYSTEM AND MEANS.

Application filed August 23, 1921. Serial No. 494,722.

*To all whom it may concern:*

Be it known that I, EARLE L. OVINGTON, a citizen of the United States, residing at Santa Barbara, in the county of Santa Barbara and State of California, have invented new and useful Improvements in Heating Systems and Means, of which the following is a specification.

This invention relates to heating systems and means, and more particularly to systems and means of and for heating dwelling rooms and apartments. The invention has for its object to provide an improved system and improved means of this general character which will be superior in point of relative simplicity and inexpensiveness of construction, organization and arrangement, taken in conjunction with economy in fuel, more even and effective and efficient distribution of heat, neatness and sightliness in appearance, economy as to utilization of space, and general serviceability, and, as a particular object, the capability of effectively maintaining a circulation of heated air throughout the compartment or room or interior which is served.

The operation of the invention preferably includes reliance upon the principle of convection with or without radiation, and the heated air is caused to circulate freely and extensively throughout the heated interior and back again to the source of heat, a thermal circuit being thus maintained in the room and insuring a substantialy uniform heating of all portions thereof.

In practicing the invention I preferably provide a metallic fire place having a heating chamber surrounding a portion of the same, with an air inlet opening leading to the heating chamber and an air outlet opening leading from said heating chamber into a room. A grill is placed at an end of the room or a portion of the room remote from the fire place with a pipe member communicating with said grill and leading to the interior of said heating chamber. The grill, as stated, is preferably placed at a point remote from the heating chamber. It will thus follow that a circulation of air is produced by this system, inasmuch as the air will pass out of the air outlet opening from the heating chamber and then back through the grill into the pipe connecting the grill with the heating chamber. I am aware that the idea of taking air from the room, circulating it behind a metallic fire place, and passing it out into the room again is not new. However, with my construction I obtain many important advantages. Most heaters of the nature stated are obviously not ordinary fire places because the air inlet and outlet are both visible, the air usually entering through a grill near the floor, passing behind the fire place to be heated, and out again through a grill higher than the first one into the room. In this construction the heated air comes straight out of the grill and because it is highly heated it ascends rapidly to the ceiling near the fire place. In addition, because the inlet and outlet pipes are in proximity to the fire place itself, the convection currents are confined to that end of the room and other portions of the room are not properly heated.

To overcome this feature I so arrange my construction that the outlet for the heated air into the room is not only concealed, but I arrange the mantel that the heated air is deflected downwardly so that it must traverse quite a space from the fire place before it rises. This effect is intensified by locating the air inlet at a point remote from the fire place. As air is taken from the room at this remote point there is a tendency toward a vacuum and the heated air from the mantel is drawn into this void, the result being that the convection currents are from the mantel downwardly, then slowly rising for a greater or lesser distance and then toward the point of reduced atmospheric pressure by the air being withdrawn from the room by the fire place inlet. By locating the air inlet at the end of the room opposite the fire place I have no difficulty in heating the most remote corners of the room. It will thus follow that I heat the entire room instead of merely heating the room in the vicinity of the fire place.

With the above and other objects in view, the invention consists in the novel and useful provision, formation, construction, association, relative arrangement and interrelation and application of parts, members and features, all as hereinafter described, shown in the drawing, and finally pointed out in claims.

In the drawing:

Figure 1 is a vertical fragmentary sectional view through a portion of a dwelling house and illustrating the installation and mode of application of the invention, said view being on the line $x^1$—$x^1$, Figure 2, and looking in the direction of the appended arrows;

Figure 2 is a front elevation of part of the showing of Figure 1, and of a portion of the flue shown therein; and, Figure 3 is a detail horizontal sectional view taken upon the line $x^3$—$x^3$, Figure 2, and looking in the direction of the appended arrows, the same being fragmentary and showing a portion of a circulation conduit shown in section in Figure 1.

Corresponding parts in all the figures are designated by the same reference characters.

Referring now with particularity to the drawing, A designates one upright wall of a dwelling house or other building construction, the same having a flooring B, while the opposite wall C is interrupted for the installation of a source of heat D. Said source of heat is shown as consisting of wooden logs $d$ installed within the fire place unit $e$ which is provided with a hearth $f$, above which hearth the logs $d$ are shown as suitably supported upon fire dogs or andirons 1. The fire place unit $e$ is supported at four points as at 2, 3, 4 and 5 by sheets of asbestos 6, or the like. The said unit $e$ may comprise a chamber having sheet metal walls 7 set into an enlarged heating chamber $g$ extending rearwardly of the wall C and being confined at the front, back and sides by brick walls 8. The chamber $g$ is enclosed at the top by a mantel 9 formed of concrete or other material, and which mantel includes a mantel-shelf S overhangs the front wall 8 as shown at $9^a$. This construction provides the depending masking wall for concealing an air duct 10 provided in the front wall 8, and which duct 10 communicates through the front wall with the room E included within the walls A and C. The inside portion of the mantel 9 where it overhangs as at $9^a$ is preferably curved, as shown at $9^b$, and such overhanging mantel portion $9^a$ with the curved portion $9^b$ tends to deflect the heated air currents downwardly and outwardly for circulation to points remote from the fire place unit as indicated by the arrows. The air heating chamber $g$ surrounds the fire place unit $e$ at the back and sides, and such fire place unit has preferably upwardly directed walls $7^a$ communicating with the stack or flue 11 which projects upwardly through the mantel 9 and communicates with the open air, being screened by the wall C.

An air circulation conduit F is provided beneath the floor B and the floor beams 12 thereof, and communicates at one end, as at 13, with the interior of the room E adjacent to the wall A, or at a point remote from the source of heat D, and communicates at the other end, as at 14, with the heating chamber $g$, at a point underneath the fire place unit $e$. This air circulation conduit may be of varied transverse dimensions, and it may be branched out to extend to other similar openings 13 in the floor B, or a plurality of such conduits F may be provided for a given interior, all communicating with the heating chamber $g$.

In practice, combustion being supported at the logs $d$, the metallic wall 7 of the fire place unit $e$ will become highly heated, the heat being conducted to air in the heating chamber $g$, and convection currents of heated air will thereupon ascend in such heating chamber and pass outwardly through the air duct 10 to the spaces exterior of the walls 8, those passing through the duct 10 in the forward wall 8 being directed outwardly into the room E by the overhanging portion $9^a$ of the mantel 9, and circulating throughout the room E. The slightly cooling air in the room E will descend to the floor B thereof because of its increased weight, and the larger portion thereof will find its way to the opening 13, (preferably covered by a foraminous register plate $13^a$), and its flow to and through the conduit F will be induced by the ascending air currents in the heating chamber $g$. Thus a continuous thermal circuit of heated and heating air currents will be maintained throughout the heating chamber $g$, the room E, and the conduit F. It is obvious that the construction shown may likewise serve other rooms and to that end suitable air conducting pipes $h$ may be provided, the said pipes extending through the mantel 9 and leading to the heating chamber $g$. Of course a similar conduit F will have to be provided at each room associated with the heated air conducted to said room through the pipes $h$ in order to promote circulation as before.

The hot surfaces of the walls 7 and $7^a$ of the fire place unit $e$ and its stack or flue $7^b$ effectively impart their thermal units to the air currents traversing the heating chamber $g$, and a repeated reheating of the air in the room E, and the re-distribution of re-circulation thereof is produced. Fresh accretions of air may be caused by ventilating the room E, and certain accretions will always occur through door and window cracks and other crevices and openings. All of the products of combustion caused within the fire place unit $e$ will pass upwardly through the flue or stack $7^b$, and the heated air currents attending use of the invention will be pure air currents free from any contamination by gases, smoke or other deleterious agents. The fire place unit $e$ will also radiate heat into the room E.

The entire appearance of the fire place unit $e$, as viewed from the open room E, will simulate that of an ordinary fire place, with its front wall 8, and the mantel 9 with its overhang 9ª will simulate the ordinary or usual mantel-piece. The fire place unit installation may be widely varied in style and design and equipment and the particular source of heat D may be widely varied, and any suitable and adapted source of heat may be employed, together with any suitable and desired mantel arrangement or wall construction and design for the heating chamber $g$, all within the spirit of the invention, and these and many other variations and modifications, it will be understood, will evidence no departure from the real invention or the true spirit thereof, which is similarly true of variations, modifications and substitutions with respect to the circulation conduit F, and building features.

Having thus disclosed my invention, I claim and desire to secure by Letters Patent:

1. A fire-place construction including a walled enclosure providing a heating chamber and the front wall of said enclosure having a fire-place opening and a heating opening communicating with the heating chamber, and a mantel-shelf above said heating opening and having a depending wall masking said heating opening.

2. A fire-place construction including a walled enclosure providing a heating chamber and the front wall of said enclosure having a fire-place opening and a heating opening communicating with the heating chamber, an outer hearth in front of the fire-place opening, and a mantel-shelf above said heating opening and overlying the outer hearth, and said mantel-shelf having an overhanging wall portion masking said heating opening.

3. A fire-place construction including a walled enclosure providing a heating chamber and the front wall of said enclosure having a fire-place opening and a heating opening communicating with the heating chamber, a mantel-shelf formed by the continuation of the top wall of said enclosure and having a depending heating-opening masking-wall constituting the front of the mantel-shelf.

In testimony whereof, I have signed my name to this specification in the presence of two subscribing witnesses.

EARLE L. OVINGTON.

Witnesses:
J. RAVATTUE,
KATHERINE FRANTZ.